Patented Dec. 23, 1947

2,433,077

UNITED STATES PATENT OFFICE 2,433,077

PROCESS FOR THE PREPARATION OF SICCATIVE OILS

Maurice Dussollier, Paris, Seine, France, assignor to Etablissements Robbe Freres, Paris, France, a French company No Drawing. Application August 29, 1945, Serial No. 613,440. In France May 24, 1944

Section 1, Public Law 690, August 8, 1946
Patent expires May 24, 1964

2 Claims. (Cl. 260—405.5).

In the search for substances which have drying properties, the dehydration of castor oil and similar non-drying oils containing hydroxyl groups in the chains of fatty acids gave rise to a large number of patents in recent years. In the processes heretofore described the castor oil is usually heated in the presence of a catalyst in vacuo, or under normal or even under superatmospheric pressure.

The number of catalysts proposed is very large, most of them being solid materials which are insoluble in castor oil. Such solid catalysts must first be finely powdered, and when the process is actually being carried out, the reaction ingredients must be continuously stirred in order to multiply the points of contact between the oil and the catalyst. This necessity of stirring, especially when added to the maintenance of a vacuum, complicates considerably the necessary apparatus. Furthermore, in order to recover the treated oil product, the reaction mixture must be filtered at the end of the process, whereby the operating costs are undesirably increased and considerable loss of materials is incurred.

The applicant has now discovered a new, simple, rapid and economical process for dehydrating oils containing hydroxyl groups in the chains of fatty acids by bubbling a stream of sulfur dioxide gas through the heated oil, without the need for any other catalyst, whereby the need for mechanical stirring has also been eliminated. In this new process, sulfur dioxide gas is introduced at the bottom of a tank containing the heated oil to be treated and acts upon the oil simultaneously as a decolorizing, deoxidizing and dehydrating agent.

The stirring caused by the passage of the gas is sufficient to equalize the temperature of the oil and the concomitant slight excess pressure carries off the water and other decomposition and reaction products. The apparatus is considerably simplified as there is no need for operating under vacuum and also no stirring mechanism is required.

Incidentally, it has been found that the sulfur dioxide exerts a marked action upon the migration speed of the isolated double bonds to assume a conjugated position. It is well known that the dehydration of castor oil leads to a mixture of two fatty acids, namely linoleic acid-9,12 possessing two isolated double bonds and octadecadienoic acid-9,11 possessing a pair of conjugated double bonds. It is the latter acid which confers upon the dehydrated castor oil its drying speed. When the oil obtained by dehydration is heated to an elevated temperature, there occurs a migration of the double bonds from the 9,12 to the 9,11 position, and the standoil is obtained at a drying speed such as that of China-wood oil (i. e. tung oil). This migration process is greatly speeded up by the use of sulfur dioxide gas.

Sulfur dioxide has been used heretofore in the preparation of siccative or drying oils. However, in all such former processes the sulfur dioxide was employed not as a catalyst but merely as an inert gas, alternatively with such other typical inert gases as carbonic anhydride or nitrogen, whereas sulfuric acid, pyrosulfuric compounds, certain oxidizing compounds of sulfuric acid or anhydrides of these acids as well as sulfonated castor oil were used as dehydration catalysts in conjunction with the gas. On the contrary, the present invention is characterized by the use of sulfur dioxide gas not as an inert gas but as an active agent for the dehydration and polymerization.

In order to illustrate more clearly my invention, without however limiting it thereto, the following example is given: Castor oil was heated in a closed stainless steel tank and a stream of sulfur dioxide gas was blown through the oil. The tank was provided with an immersed tube for the introduction of the gas and with an outlet pipe connected with a downwardly sloping condenser, and also with control and safety valves. At 140° C. the dehydration began and thereafter the temperature was slowly raised to 280° C. while condensing and collecting the resulting water which served as an indication of the progress of the reaction. This temperature was maintained for three hours and the product was a very slightly colored oil having an acid number of 14, viscosity of 20 poises and a hydroxyl index of 20. This oil was dried on a glass plate in four hours after addition of 0.1% of metallic cobalt and was found to be especially well suited for the manufacture of paints and varnishes.

What I claim is:

1. A process for the preparation of drying oils comprising heating castor oil to a temperature